H. SMITH.
GUARD FOR AN AUTOMOBILE WINDOW.
APPLICATION FILED FEB. 2, 1916.
1,208,223. Patented Dec. 12, 1916.
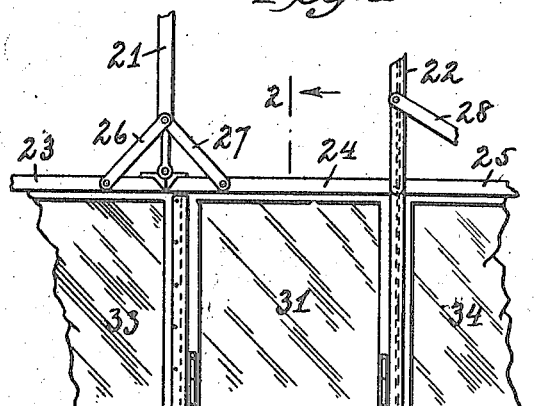
Fig. 1
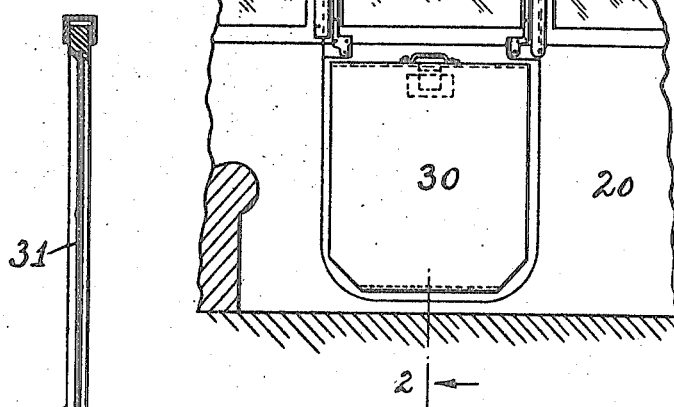
Fig. 2 Fig. 4
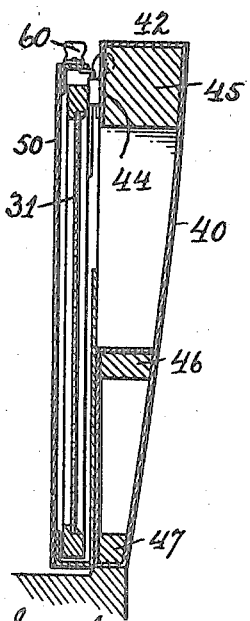
Fig. 3
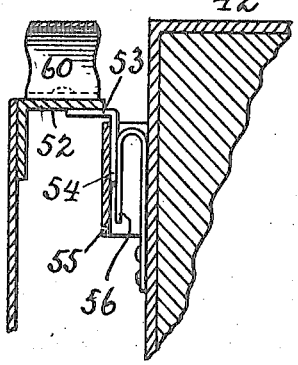
Hinsdale Smith, Inventor:
by William R. Baird
his Atty.

UNITED STATES PATENT OFFICE.

HINSDALE SMITH, OF SOUTH HADLEY, MASSACHUSETTS, ASSIGNOR TO THE SPRINGFIELD BODY CORPORATION OF NEW YORK.

GUARD FOR AN AUTOMOBILE-WINDOW.

1,208,223.

Specification of Letters Patent.

Patented Dec. 12, 1916.

Original application filed September 15, 1913, Serial No. 789,738. Divided and this application filed February 2, 1916. Serial No. 75,635.

*To all whom it may concern:*

Be it known that I, HINSDALE SMITH, a citizen of the United States, residing at South Hadley, in the county of Hampshire and State of Massachusetts, have invented certain new and useful Improvements in Guards for Automobile-Windows, of which the following is a specification.

This invention relates to guards or shields for windows of automobiles of the convertible type, that is, for an automobile having a body and a top and removable windows adapted to be inserted between the body and the top to inclose the space within or to be removed therefrom in order that the vehicle may be used as an open touring car.

In my Letters Patent No. 1,181,689 issued May 2, 1916, I have described and claimed an automobile of this general character with a foldable top and in connection therewith have described doors with which the vehicle is provided as having window sections secured thereto and adapted to be moved to a position either alongside of or above the door and which window sections when in the former position were described as provided with a cover or shield, and this application has for its subject matter such cover or shield, the invention having been divided out from the application mentioned by a requirement of the Patent Office.

In the drawings there is illustrated a preferred form of the invention. Figure 1 is a side elevation and partial central vertical section of an automobile embodying the invention; Fig. 2 is a transverse vertical section on the plane of the line 2—2 in Fig. 1; Fig. 3 is a view similar to Fig. 2, but showing the door window section in its lowest position; and Fig. 4 is an enlarged sectional detail of the cover fastening device.

In the drawings, 20 designates the body of an automobile provided with a top which in the form illustrated is a foldable one having bows 21 and 22, and horizontally arranged frame members 23, 24 and 25, stiffened and held in place by links 26, 27 and 28, and which top is adapted to be lowered to place in the manner described in the patent application above referred to.

The vehicle is provided with one or more doors indicated at 30, each adapted to swing on vertical hinges (not shown) at its rear side, and each provided with a window sec-
tion generally indicated at 31 and which is adapted to be swung to a position above the door by means of an offset member indicated at 32 and to a position alongside of the door. Slidable windows indicated at 33 and 34 are adapted to inclose the space between the body and the top at each side of the door window section. The doors may be made in any usual suitable manner. In the example shown, they are formed of an outer wall 40, a bottom 41, a top 42 and inner wall members 43 and 44 and are reinforced by transverse slats or strips indicated at 45, 46 and 47. The precise form of the door is not material to the invention and forms no part of it.

When the window 31 is in the position indicated in Fig. 3, that is, lowered down alongside of the inner surface of the door, it is apt to be struck by persons or things inside of the vehicle and become broken on account of its fragile nature. In order to prevent this, I have provided a guard or shield comprising a flat plate 50 secured to the door at the bottom by a hinge member 51 which in the case illustrated is a strip of stout fabric secured in any suitable manner to the inner wall member 43 and to the plate 50. This permits of the plate 50 being moved upward and swung outwardly and away from the door, so as to afford room and opportunity for the window section 31 to be swung on its hinge, which is arranged at the top of the door, also to the position shown in Fig. 2.

In order that the cover may be retained in proper position, both when the window is in its upper and lower position, it is provided with a fastening device which comprises a strip of material 52 to which is secured an angular flange 53 having a downwardly projecting member 54 adapted to be moved downwardly over the edge of a flange 55 secured to the inner side of the door and which is provided with a resilient member 56 formed of a bent strip of metal also secured to the inner side of the door, so that when the member 54 is pushed downwardly to the position shown in Fig. 4, it will be firmly retained in place without any danger of accidental displacement. A handle indicated at 60 is adapted to facilitate the movement of the cover in and out of engagement with the fastening device.

When it is desired to fold the window the handle 60 secured to the cover 50 is grasped and the cover is lifted upon its pivot thereby disengaging the member 54 from the flange 55. The cover is then swung away from the door and the window swung alongside the door. After the window has been brought to the latter position the handle is again grasped and the cover lifted and swung so that the member 54 may again engage and be held by the member 55. To bring the window above the door when it is in its folded position of course it is only necessary to repeat the above operation of the cover.

I claim:—

1. A door for a vehicle body, a window pivotally mounted on the door and adapted to be moved to a position above it or alongside of it, in combination with a hinged cover for the window secured to the door, and means for holding the cover in place when the window is in either of the two positions.

2. A door for a vehicle body having a window pivotally connected to the upper edge portion thereof adapted to be swung downwardly and inwardly alongside the door, and to be swung to an upstanding position above the door, a hinge connected cover for the window, and means for detachably connecting the upper edge portion of said cover with an upper portion of the door.

3. A door for a vehicle body, a window hinged at the upper edge of the door and adapted to be moved to one position above the door and to another position alongside of the door, in combination with a cover for the window mounted on the door when in the latter position.

4. In a vehicle of the character described, a door, a window hingedly secured thereto at its upper inner edge, a cover for the window secured to the door at its lower inner edge, and means for holding the cover in position including a bar on the cover and a member on the window adapted to engage therewith.

5. In a vehicle of the character described, the combination with a door, of a window hinged to its upper edge and a cover for the window hinged to its lower edge, and means for securing the cover to the door and which means are arranged above the window when the latter is in its lowered position, including a bracket on the door, a spring within the same and a bar on the cover adapted to be engaged by the bracket and the spring.

6. The combination of a vehicle door, a window hinged thereto at its upper edge and a cover for the window comprising a plate hinged at the bottom of the door, the window and cover having overlapping relations, and means for temporarily holding the cover in place.

7. In a vehicle of the character described, a door, a window hinged thereto and a cover for the window comprising a plate secured to the bottom of the door by a hinge and to the top of the door by a latch and catch, the catch being fastened to the door and the latch to the cover, the latch having an annular form whereby it may be used as a handle to move the door.

In testimony whereof I affix my signature.

HINSDALE SMITH.